C. F. DAWSON & L. W. LUELLEN.
SYSTEM OF MOBILE ARMAMENT.
APPLICATION FILED NOV. 23, 1915.

1,244,431.

Patented Oct. 23, 1917.
8 SHEETS—SHEET 1.

Cecil F. Dawson INVENTORS
and Lawrence W. Luellen,
BY
ATTORNEY

C. F. DAWSON & L. W. LUELLEN.
SYSTEM OF MOBILE ARMAMENT.
APPLICATION FILED NOV. 23, 1915.

1,244,431.

Patented Oct. 23, 1917.
8 SHEETS—SHEET 3.

C. F. DAWSON & L. W. LUELLEN.
SYSTEM OF MOBILE ARMAMENT.
APPLICATION FILED NOV. 23, 1915.

1,244,431.  Patented Oct. 23, 1917.
8 SHEETS—SHEET 4.

FIG. 5
FIG. 6

Cecil F. Dawson
and Lawrence W. Luellen, INVENTORS
BY
ATTORNEY

C. F. DAWSON & L. W. LUELLEN.
SYSTEM OF MOBILE ARMAMENT.
APPLICATION FILED NOV. 23, 1915.

1,244,431.

Patented Oct. 23, 1917.
8 SHEETS—SHEET 7.

Cecil F. Dawson
and Lawrence W. Luellen, INVENTORS

BY
ATTORNEY

C. F. DAWSON & L. W. LUELLEN.
SYSTEM OF MOBILE ARMAMENT.
APPLICATION FILED NOV. 23, 1915.

1,244,431.

Patented Oct. 23, 1917.
8 SHEETS—SHEET 8.

UNITED STATES PATENT OFFICE.

CECIL F. DAWSON, OF NEW YORK, N. Y., AND LAWRENCE W. LUELLEN, OF MOUNTAIN LAKES, NEW JERSEY.

SYSTEM OF MOBILE ARMAMENT.

1,244,431.   Specification of Letters Patent.   Patented Oct. 23, 1917.

Application filed November 23, 1915.  Serial No. 62,950.

*To all whom it may concern:*

Be it known that we, CECIL F. DAWSON and LAWRENCE W. LUELLEN, citizens of the United States, residing at New York city, in the county and State of New York, and at Mountain Lakes, in the county of Morris and State of New Jersey, respectively, have invented certain new and useful Improvements in Systems of Mobile Armament, of which the following, taken in connection with the accompanying sheets of drawings, is a full, clear, and concise description of one form thereof.

At the present time readily mobile armament for use on land outside of fortifications is limited to the smaller caliber guns, while those in fortifications, through the aid of aerial scouts become a fixed and known target to an enemy, who may transport in knock-down form sufficient armament of a like kind to demolish the fixed fortification and armament.

Recent devlopments have shown that guns of long range and large caliber have a decided advantage over great forces with a shorter range armament. It therefore becomes very desirable to be able to quickly mobilize the large caliber, long range guns, in sufficient numbers, to the point of attack or to concealed positions from which they may destroy the enemy.

Along our coast lines and borders and extensive areas which it is impractical to fortify by fixed fortifications, it is extremely desirable to have heavy artillery so constructed and mounted that it may be mobilized to any desired point or points, where it may be used with as great, if not greater, effectiveness than it could be used in a fixed fortification.

The advantage of heavy armament on battleships is that it may be mobilized to any desired point for attack. Land protection is even more essential and heavy guns can be used with greater accuracy of firing from solid foundations. One of the objects of our invention is to provide heavy mobile armament, which may, in sufficient numbers, be quickly positioned and more accurately fired from solid foundations than on battleships.

The condition of the roads, bridges and general topography of the country make it impractical to move very heavy artillery thereon. The railroad transportation facilities therefore must be resorted to. These, however, do not possess at the present any means whereby the larger caliber guns may be transported, except in knocked-down condition.

One object of our invention is to surmount these difficulties by utilizing the present coast and inland railways as a partial means of a system of armament in order to give flexibility and strategic value to heavy power guns, such as are now used in fixed fortifications.

Another object of our invention is to provide heavy armament of a mobile character which can be transported and quickly used to protect inland cities or points, which under the present practice would require fixed fortifications of an expensive nature, and should the point of the attack shift from that city or point to another the same armament could be readily transported and effectively used in such other quarters, whereas, fixed fortifications limit the usefulness of these guns to one particular location.

Another consideration is that permanent fortifications require a large number of guns, most of which will be idle, while at the particular point of attack an insufficient number of guns will be concentrated. The enemy will, in fact, select that point for attack which is least defended.

With the present invention, however, a much smaller number of guns may be employed and yet produce a greater degree of protection, as they can be concentrated at the location where they are actually needed.

As the guns are the most expensive elements of fortification, the saving effected by reducing the number needed may be employed in erecting the railroad facilities and gun emplacements in adequate quantity and much wider distribution than would be possible with fully armed permanent fortifications. Thus a much more efficient use of the armament provided is obtained, and much more effectual protection provided.

Another advantage of this system is that the number, size and type of guns concentrated in a particular location cannot be known in advance, to the enemy, as in the case of permanent fortifications, but guns may be concentrated quickly in such numbers and at particular points when needed. This may be done on short notice and under conditions which make it impossible for the enemy to have any accurate knowledge of the type of artillery which they will have to meet.

So far as our knowledge extends, we know of no instance where guns of greater than 6" caliber have ever been transported by rail, and put immediately into use without being removed from the transporting means. The reason for this is the lack of a sufficiently strong foundation under the rails, and the fact that the wheels, rails and parts of the chassis cannot withstand the shock of firing and the recoil of the gun. Therefore to make possible the transportation and instant use of large caliber guns, in assembled and ready-to-use condition, it requires an additional means of support. That is, a support supplementaing the mobile support.

In carrying our invention into practice, we propose to install at fixed and predetermined points, along existing railroads, or at desirable strategic points, where railroad facilities may be installed, suitable foundations, preferably concrete, of sufficient size and stability, from which the heaviest powered guns may be fired and suitable cars upon which the heavy power guns may be mounted, which may be transported to the location of and brought into coöperation with such foundations for firing.

These concrete foundations may be located on spurs or side tracks, either singly or in groups as desired, behind hills, in railroad cuts, and other secluded spots, along the region which it is desired to protect at a very nominal cost, as compared to building fortifications at those points. The heavy mobile guns therefore, according to our invention, can be transported to any section of the country and immediately used to a better advantage than if they were mounted as a fixed piece of armament, which would require an expensive fortification around it.

Thus it would be possible, by means of our invention, to protect every portion of a country with the heavy artillery at a very nominal expense.

Having thus referred generally to the nature of our invention, we will proceed to describe in detail the embodiment thereof illustrated in the accompanying drawings.

Figure 7:
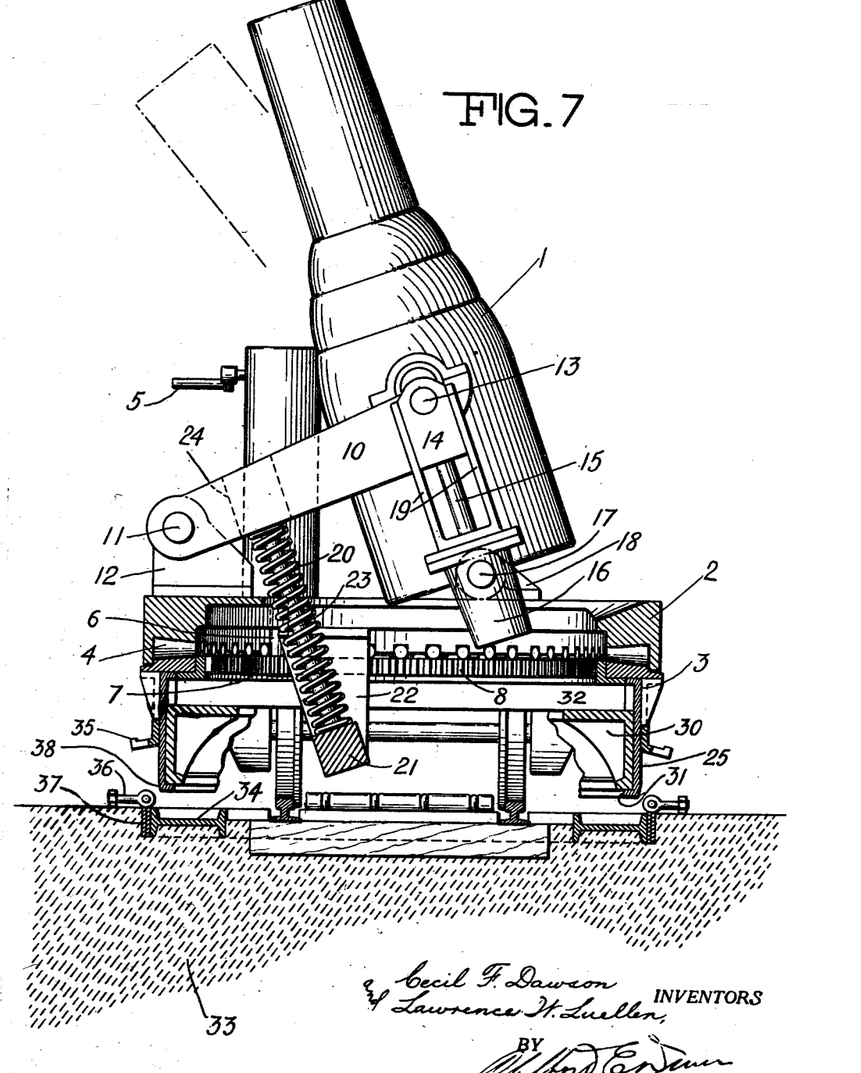
Fig. 7 is a cross-sectional view of the transporting car, taken on line a—a of Fig. 5, excepting that the mortar is shown in elevation, and illustrating the manner in which the car and turn table are constructed to accommodate and permit the firing thereof.
Figure 8:
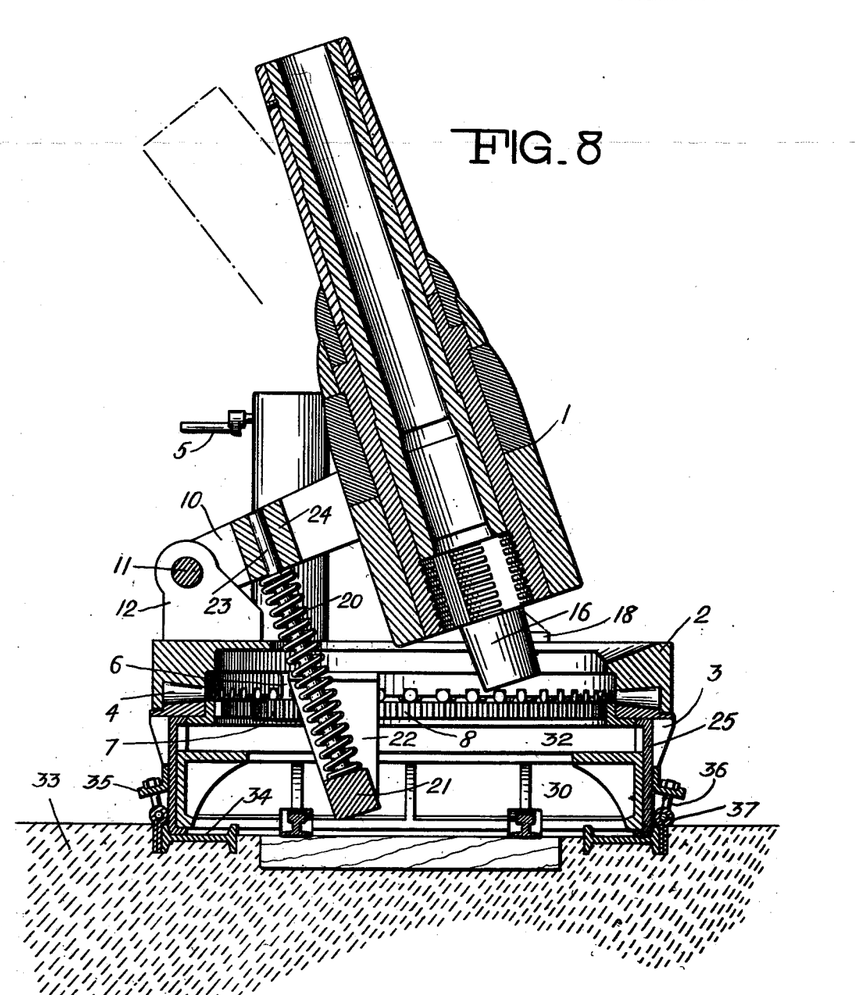
Fig. 8 is a similar view showing the mortar in section, the car being lowered into position upon the stationary or fixed foundation.

In constructing a car, or what we term herein, a "mobile support" to accommodate large mortars such as illustrated in Figs. 5 to 8 inclusive, we make provision for the movement of the same when fired, by constructing the mobile support in the manner more particularly shown in detail in Fig. 7. The mortar 1 is mounted upon the turn table 2, the latter being revolubly supported upon the chassis 3, interposed between which are the roller bearings 4. The turn table 2 is preferably revolved by hand by means of a mechanism, such as illustrated in Figs. 7 and 8, the same comprising manually-operated and oppositely-disposed cranks 5, the operation of which revolves a shaft 6, having at its lower extremity a pinion gear 7, which is in mesh with an interiorly-toothed gear ring 8, which is fixed and is positioned circumferentially within a part of the chassis 3. The mortar 1 may be supported in proper operative position by any desirable means. We have shown it pivotally supported by arms 10, which in turn are pivoted at 11 to fixed standards or uprights 12. Swivelly supported at pivoted points 13 are sliding blocks 14. To these blocks 14 are fixed piston-rods 15, which carry at their lower extremities pistons which operate in dash pots 16, which are swivelly supported at 17 to standards or uprights 18. Projecting upwardly and affording guiding means for the blocks 14 are guide-ways 19. Supplementing the buffing or restraining action of the dash pots 16, to retract and reposition the mortar after it has been fired, we employ a plurality of springs 20, these being interposed between a fixed support 21, carried by depending brackets 22, supported by the turn table 2. These springs surround the rods 23, which are fixed at one end to the cross-support 21, their upper extremities being reciprocally mounted in suitable bearings provided in a cross-support 24, the ends of which are fixed to the supporting arms 10. Accommodation is provided in the turn table for whatever movement is imparted to the mortar when firing, the dash pot 16 and the springs 20 serving to return the mortar to firing position.

The chassis of the gun or mobile support may be constructed in any suitable manner. We have illustrated for the purpose, a frame work possessing great strength as well as lightness. A pair of side beams 25 situated in parallel relation at the sides of the carriage are supported by the upper arms of knuckle joints disposed at opposite ends of the vehicle, the lower arms of the knuckle joints being supported by pivotal means to the trucks 28.

In order to prevent too great a degree of side swing or lateral cant of the chassis upon the springs of the vehicle, we mount upon the truck frame 28, pillars or posts 28$^a$,—preferably two in number and at opposite ends of the car,—the free upper ends of which are housed within suitable housings 28$^b$, the latter being mounted upon the cross-beams of the chassis, which extend across and are connected to the side beams 25. A sufficient clearance or space is provided between the upper extremity of the pillars 28$^a$ and the top of the housing 28$^b$ so as to allow for the relative movement of the carriage when being lowered into supporting position. Substantial clearance is also provided between these pillars and housings so that, when running under favorable conditions along a straightway, no frictional contact will be had between the parts. This clearance, however, being slight, enables the pillars to be brought into contact with the housings when the chassis is subjected to slight sways in turning curves and mounting and descending grades. This affords a substantial steadying means for the chassis.

Figure 11:
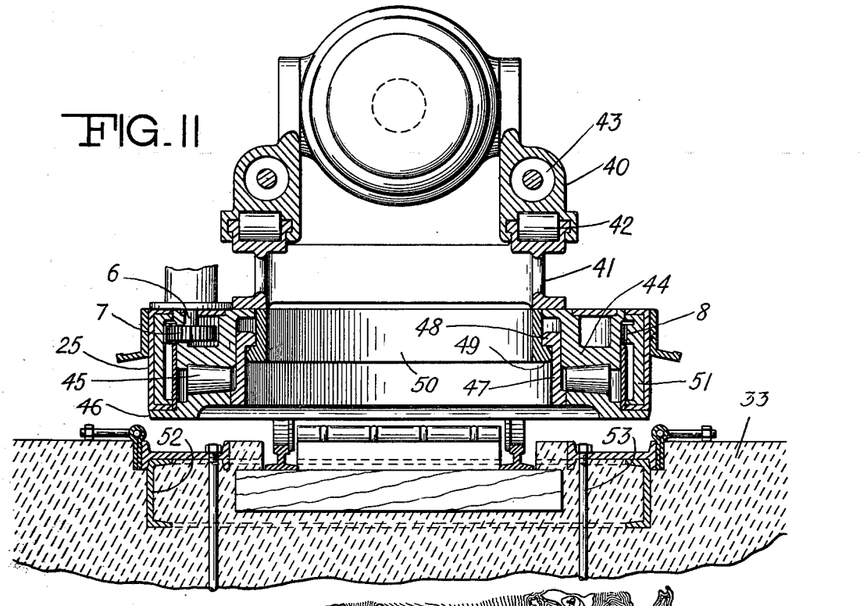
Fig. 11 is a cross-sectional view taken on line b—b of Fig. 9 showing a mobile support suitable for large caliber rifles.

The side beams 25 are joined together at their ends by end beams 29. This general frame work may be strengthened and reinforced in any suitable manner. We have illustrated generally a reinforcing scheme directly beneath the gun carrying turn tables, the same comprising a square box-like hollow casting 30, supported by inturned ends 31 of the side beams 25. Above this casting and extending transversely of the car is a beam 32, arranged to support a portion of the chassis, thus affording supplemental strength to the seat of the turn table. The trucks, wheels, and axles are of conventional form, as are also the rails, and ties. The ties are embedded in the stationary foundation 33. This foundation is preferably made of concrete, as shown in Fig. 7 and may, if desirable, be of a reinforced character such as illustrated in Fig. 11, the latter being shown in connection with the support of a mobile carriage adapted to support heavier guns such as large caliber rifles. In connection with the mobile mortar support or carriage, we embed in the concrete stationary foundation I-beams 34 arranged rectangularly, as illustrated in Fig. 7. These I-beams are partly submerged in the concrete, the upper channels being vacant and free to receive the rectangular frame-work of the mobile carriage when the latter is lowered into supporting position, as is shown in Fig. 8. In order to anchor the carriage when lowered, suitable anchoring means is provided. This may comprise laterally extending bolt brackets 35 arranged along the side beams 25 and transversely along the casting 30. Coöperating with these bolt brackets are swiveled bolts 36 pivoted to anchorages 37 and arranged to be swung upwardly into position within the apertures or slots of the bolt brackets, suitable retaining and tightening nuts being provided on the bolts. When the carriage is lowered and the bolts are in position, the gun is ready to be fired, as shown in Fig. 8. The lower extremity of the carriage as at 38 is chamfered off so as to afford a snug fit within the channel of the supporting I-beam.

In constructing a mobile support or car for large caliber rifles we consider it preferable to mount the rifle upon a turn table 39 situated in the cradle at the center portion of the carriage, the rifle being reciprocally mounted upon the turn table 39. The mechanism for allowing the gun to reciprocate is shown in section in Fig. 11, this comprising a two-part support 40 and 41 having interposed therebetween a series of rollers 42. When the gun is fired the gun recoils and to take care of the forces occasioned thereby these rollers and the oil cylinders 43 are provided. The supporting member 41 of the carriage at the breach of the gun is at a higher inclination than the forward end, the difference being approximately 4 degrees so that the gun may return under gravity to its normal firing position.

In constructing a mobile support or carriage for these large caliber rifles, additional strength is required over that of the carriage that might be suitable for the transportation of mortars of less weight. We have illustrated in Fig. 11 a chassis of a character which we think desirable for the purpose. Beneath the carriage member 41 is the supporting turn table, the main supporting part of which is indicated by the numeral 44, this being mounted upon roller bearings 45, which are supported upon a bed 46, which, in turn, is fast to the side beams 25. Fastened to the bed 46 is a ring 47 having an inwardly-projecting flange 48. A coöperating flange 49 is formed integral with a ring 50, the latter being fast to the turn table. In this manner the turn table is positively secured and held upon the roller bearing. Arranged circumferentially around the turn table is a ring 51, provided at its upper extremity with circumferentially-arranged teeth 8, forming a large cog, which is engaged by a pinion 7, mounted upon a shaft 6 of the turning mechanism, which has heretofore been described in connection with the mortar carriage. If it is desired to impart additional strength to this stationary foundation, this may be done by embedding U-beams 52 and by anchoring the I-beams by suitable tie-rods 53 in the concrete.

Figure 9:
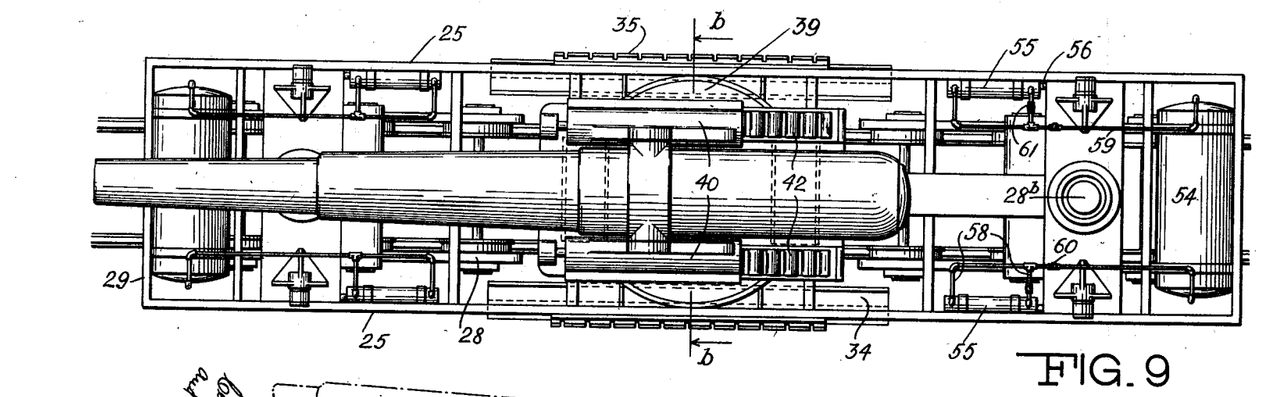
Fig. 9 is a view similar to Fig. 5, but showing a car constructed to accommodate a large caliber rifle, and also showing means by which compressed air may be utilized for lowering and raising the car or mobile support.

Any suitable means may be employed for lowering and raising the mobile gun support to and from the fixed supporting foundation. We have illustrated several methods of accomplishing this result, one being by means of compressed air, such as illustrated in Figs. 9 and 10,—another being by electric motor, such as illustrated in Figs. 5, 6, 12 and 13; and another by manual labor, such as illustrated in Figs. 12 and 13.

In order to utilize compressed air for the purpose, we mount compressed air tanks 54 at each end of the mobile support or car, and preferably pairs of air cylinders 55, in which are located pistons, the piston-rods 56 being connected with the center pivot 57 of the knuckle-joint, suitable inlet pipes 58 being provided having communication with a main supply pipe 59, the pipe 59 being valve controlled at 60, the inlet pipe communicating with the lower end of the cylinder being suitably valved at 61. When it is desired to lower the mobile support or carriage upon the fixed foundation, it is accomplished as follows:—

Figure 10:
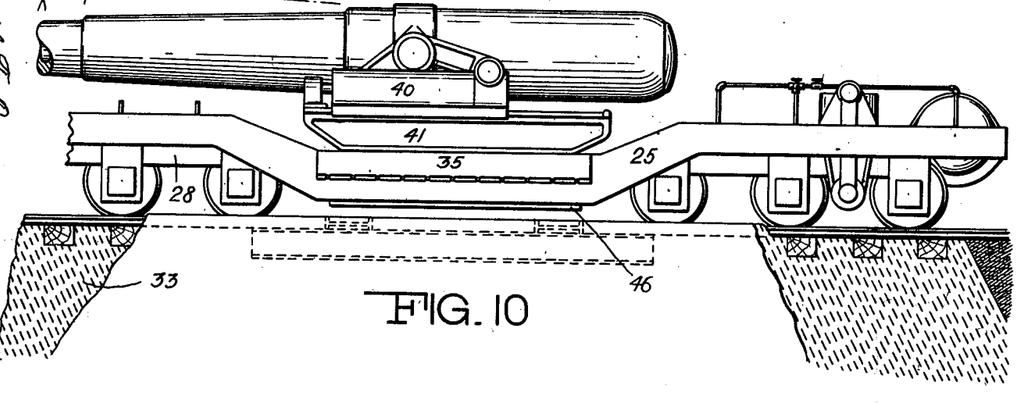
Fig. 10 is a view in side elevation, a part of the car being broken away and the foundation being partially illustrated.
Figures 12, 13:
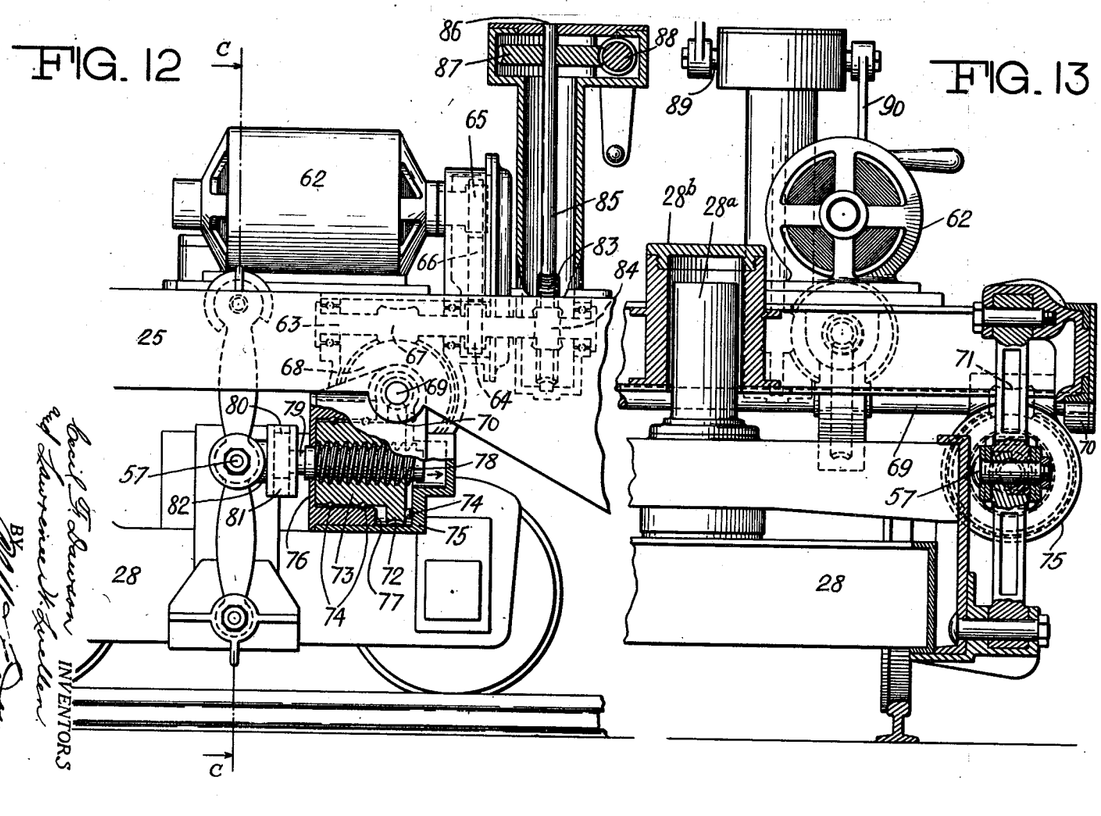
Fig. 12 is a view in side elevation, partly in section, showing the manner in which the mobile gun support may be lowered or raised from the fixed support electrically or by hand.
Fig. 13 is an end view, taken on line c—c of Fig. 12.

The pistons in the cylinders 55 are under air compression, the knuckle joints being in vertical supporting position as shown in Figs. 10 and 12. The valves 60 are first closed and valves 61, which open to the atmosphere, are thereupon opened, thus exhausting the air in the cylinders 55 to the atmosphere. This being done, the pistons are free to travel along the cylinders, and under the weight of the chassis, the knuckle joints give and perform their scissor-like operation in lowering the car. The rapidity with which this lowering motion may take place is controlled entirely by the manipulation of the valves 61. On the other hand, should it be desired to raise the car, then the valves 61—being two-way valves—are closed to the supply-line 59, but opened to the atmosphere, in order to exhaust from the upper side of the pistons, valves 60 are thereupon open, and the compressed air from the tank or reservoir 54 flows into the cylinders 55 and acts upon the pistons therein, thus forcing them outwardly and moving the knuckle joints 57 to vertical supporting positions.

In order to accomplish this lowering and raising operation electrically, we have shown in detail in Figs. 12 and 13, one form of mechanism capable of accomplishing the same. This may be conveniently described as comprising an electric motor 62 near the end of the car. Suitably supported in brackets is a counter-shaft 63, upon which is mounted a sprocket 64, which is drivingly connected with a sprocket 65 upon the armature of the motor, the drive being through a sprocket chain 66. Mounted upon the counter-shaft 63 is a worm 67, which meshes with a worm-wheel 68, mounted upon a shaft 69, the latter having bearings in suitable supports 70 fastened to the side beams 25. Mounted adjacent each end of the shaft 69 is a worm 71, which in turn meshes with a worm-wheel 72, which is provided with an extension 73, the same being supported upon suitable bearings 74 within a housing 75 and a cover 76, the latter being provided with an extension 77 fitted within said housing. The worm wheel 72 and extension 73 are provided with an internal worm-thread coöperating with a worm 78 upon the shaft 79. The end of the shaft 79 is provided with a shoe 80, mounted within a mortised or T- shape casing, 81, the shoe 80 being relatively movable within the said casing for the purpose hereinafter more particularly pointed out. The casing 81 is preferably formed integral with an extension 82, the same being connected with the pivot 57 and providing a bearing therein. The operation is as follows:—

The motor 62 being energized, rotary motion is transmitted through the chain 66 to counter-shaft 63, through worm 67, to worm gear 68, and to shaft 69, and to worm 71, to worm-wheel 72, to worm 78, causing the latter to move in the direction of the arrow. This causes the center pivot of the knuckle joint to correspondingly move, thus lowering the chassis upon the stationary foundation. In order to accomplish this operation, by reason of the fixed bearings of the shaft 69, the housing 75 is suspended upon said shaft in a way to be movable relatively thereto. As the worm 78 traverses the worm grooves of the gear 72 and sleeve 73, a simultaneous swinging movement is imparted to the housing 75 and a downward movement is imparted to the shoe 80 within the casing 81 concurrently with the bending of the knuckle joint. The shoe 80 and housing 81 serve to lock the knuckle joint in its supporting position, as well as to compensate for the shortening radius between the pinion 57 and shaft 69, as the knuckle joint is operating to lower the chassis.

Should it be desired to operate this lowering and raising mechanism by hand rather than by electric motor, or as a precautionary measure, in the event that the electric motor should become disarranged, we may arrange a hand-operated mechanism located at the end of the shaft 63. This may comprise a worm-wheel 83, mounted upon the shaft 63, which meshes with a worm 84 mounted upon a shaft 85, having a bearing in a housing as at 86. Upon the upper extremity of this shaft is a worm-wheel 87, which, in turn, meshes with a worm 88, mounted upon a shaft 89 which, in turn, is operated at either extremity with a hand-crank 90. The operation of this is apparent. By turning the cranks 90 the necessary rotary motion is transmitted to the shaft 63 and to the train of following mechanism which operates the knuckle-joint. By reason of the differential gears that are employed in this train of gearing, great leverage is had and the lowering and raising of the chassis may be readily and expeditiously accomplished by manual labor.

Where desired we may simplify our invention by doing away with the raising and lowering mechanism. To do this we form the top surface of the supporting foundation upon an inclination as at 85, the lower surface of the chassis being similarly inclined as at 86, so that the gun-carrying car may be run upon the supporting foundation in wedge-like fashion, as is thought to be clear from the illustration in Fig. 14. Within the track rails we provide a beam 87, pivotally mounted at 88, and braced or supported by an arm 89, when in operative position. This beam 87 is raised after the mobile support has gotten into place upon the stationary support and prevents the car from moving therefrom.

Figure 1:
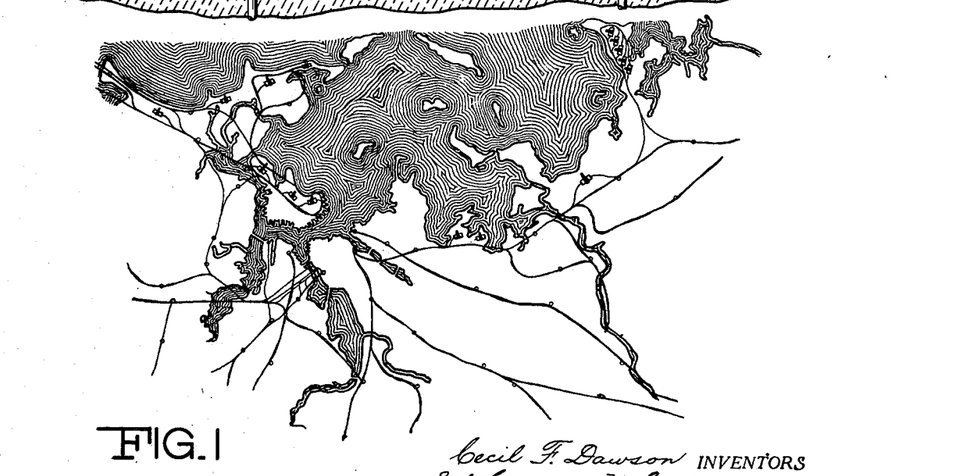
Figure 1 illustrates a fragmentary portion of our country's coast and railway lines showing the manner in which the latter may be utilized in carrying our invention into practice, thus showing how much more effective mobile armament is than the fixed armament of fortifications.
Figure 2:
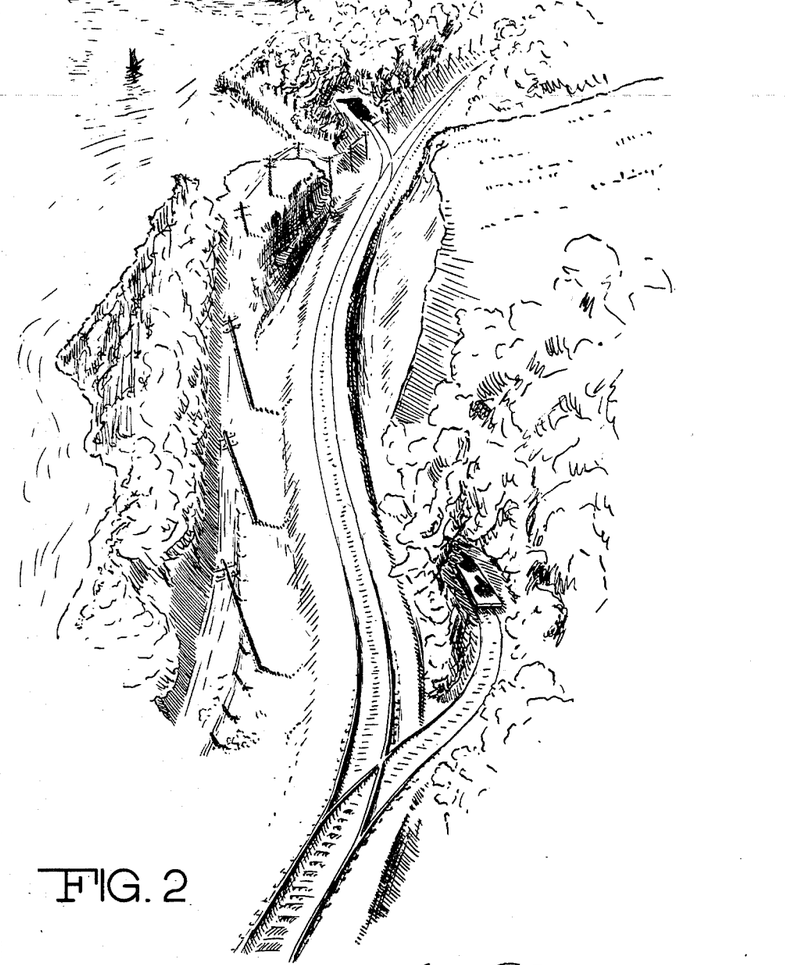
Fig. 2 is an enlarged detail of an imaginary coast line showing a single track railroad traversing a cut upon which spurs project at points which may be selected for their strategical value, and at which points are located fixed foundations or supports for mobile large caliber guns, the use of which is made possible by our invention.
Figures 3, 4, 14:
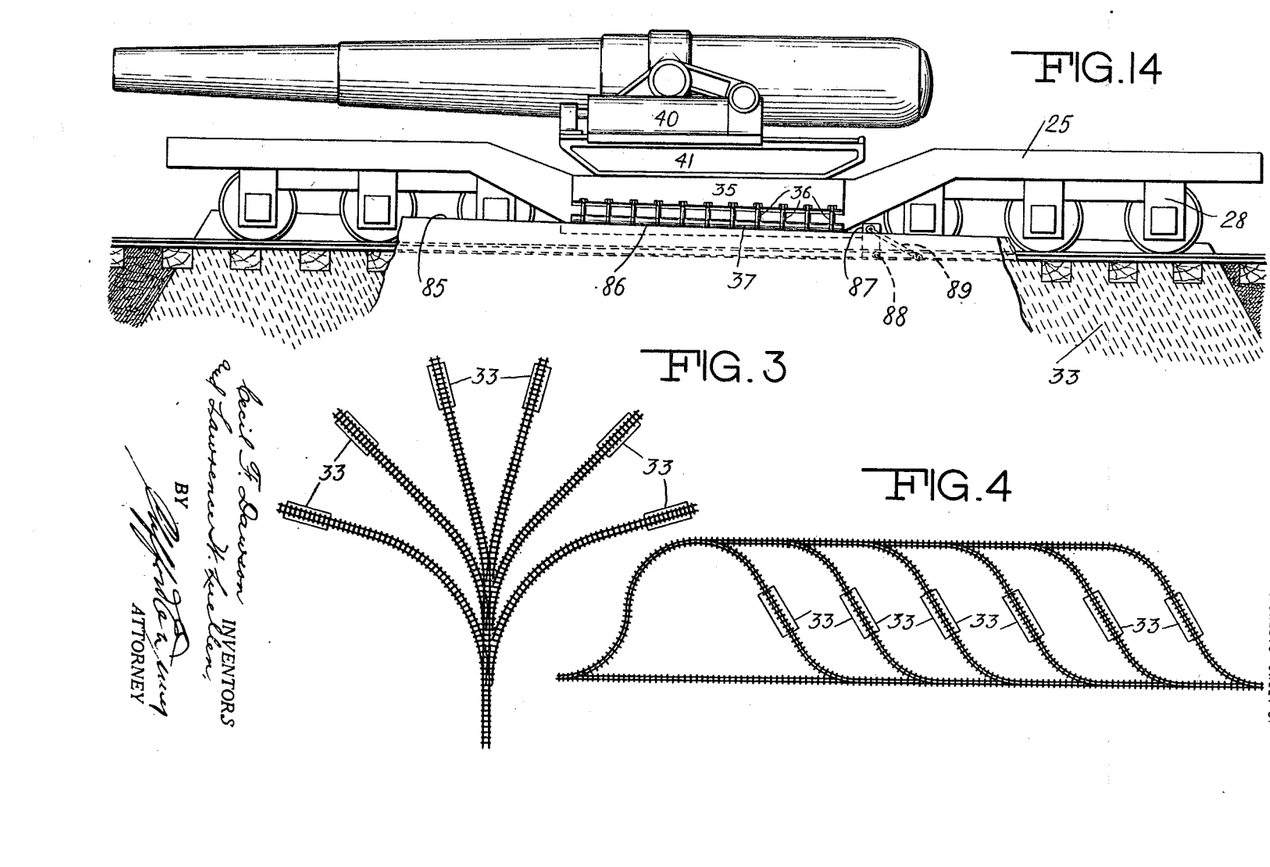
Figs. 3 and 4 are details in plan view showing a variety of ways in which spurs may be conveniently arranged to afford the grouping of the guns transported along a single railroad track.
Fig. 14 is a view in side elevation of a modification, the bed of the gun car support being inclined, and the fixed support or foundation being similarly inclined so that the car and foundation may be brought into effective coöperation expeditiously and without the necessity of lowering the mobile gun support upon the fixed support.
Figures 5, 6:
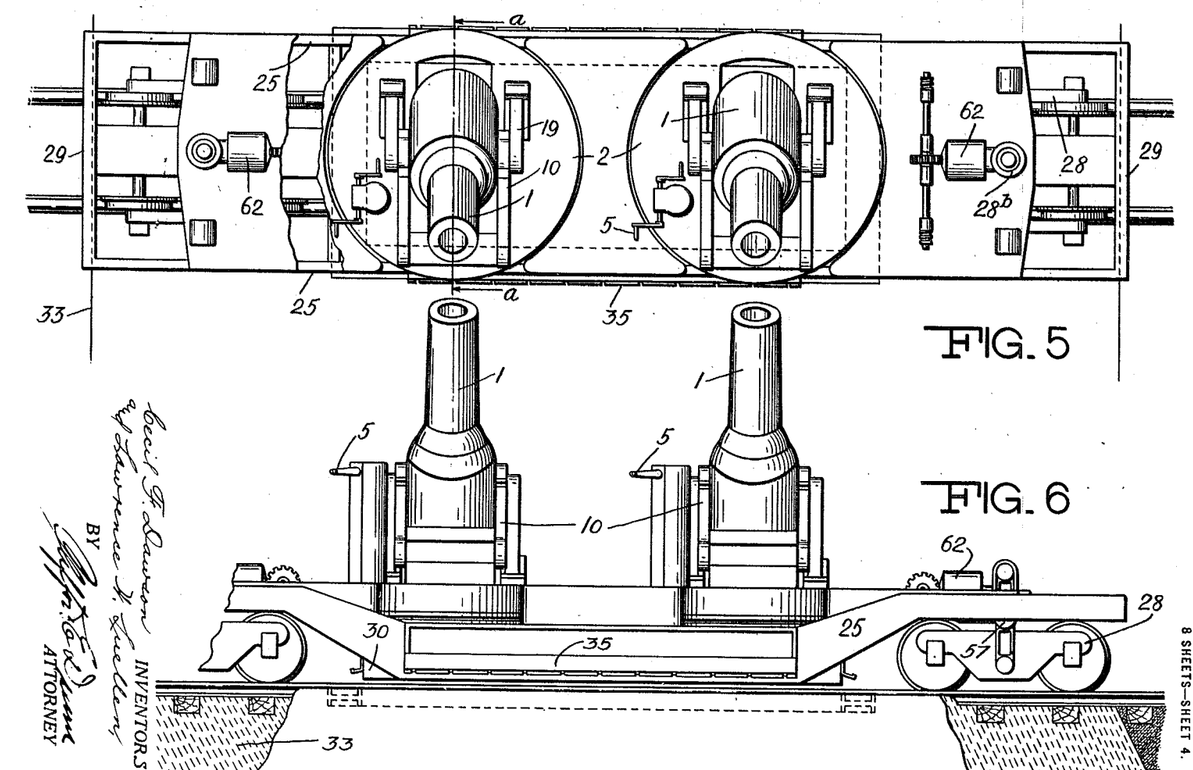
Fig. 5 is a view in top plan of a railway car built for the support and conveyance of a pair of mortars, these being mounted upon turn-tables, the supporting platform being adapted to be lowered upon the stationary fixed supporting foundations distributed at desirable points along the railroad.
Fig. 6 is a view in side elevation thereof, showing the supporting platform in the shape of a cradle so as to minimize the vertical movement thereof when being lowered into engagement with, or raised from the fixed stationary supporting foundation, the latter being illustrated in fragmentary detail.

The stationary supporting foundations may be positioned or disposed at desirable points along a railroad and may be, where conditions warrant, grouped in the manner shown in Fig. 3. Here a number of single tracks or spurs lead from a main single track and branch off somewhat in fan fashion, the supporting foundations 33 being located at the extremities of the branches or spurs. In this manner the high-power guns may be brought to position to resemble, in a measure, a fort.

In order to expeditiously group a number of large guns from a single track of railroad, we have designed a plan of doing so, this being illustrated in Fig. 4. By this plan the mobile guns may be transmitted in both directions along the railroad and concentrated at the point where the foundations are located.

The spurs or branches illustrated diagrammatically in Figs. 3 and 4 will be specially constructed at strategic points, and so arranged that the guns may be grouped in desired battery formation. These spurs will have associated with them designated gun locations, the ranges from which will be plotted in advance so that when the guns are placed on the spurs, their fire can be definitely controlled. As these spurs are especially adapted and constructed for receiving the guns and as they will ordinarily be under the exclusive control of the military authorities, they may aptly be termed "military spurs."

The present art of warfare shows that aerial scouts are used effectively to direct gun firing, and it is exceedingly desirable to have a sufficiently mobile, long range, gun, so that the aerial scouts of to-day cannot so readily direct the firing upon it or ascertain the position in which it is located. Our invention allows us an opportunity of changing the location of that gun or battery before the scout could return to headquarters or report its location.

The greatly enhanced strategic difficulties which are involved in an attack of an abnormally mobile enemy have long been recognized, and to be surprised is, from a military viewpoint, a serious calamity. We believe, through our invention that we have given the greatest possible mobility to heavy guns for or against attacks by land or water.

With our invention it will be seen that guns of the heaviest caliber may be transported from place to place, and may be mounted in firing position in such a way that they are adequately supported, and the shocks of recoil are fully taken care of and that, at the same time, this may be done without removing the guns or gun mounts from the running gear, or displacing the same from the tracks or road-ways. In this way the highest degree of mobility is retained at all times, and the guns, while firmly supported during firing, may be almost instantly shifted from one location to another as conditions may require. Thus, no delay is incurred in getting the guns in condition to fire, and, at the same time, in case of the necessity for retreat, the guns can be quickly withdrawn to positions of safety. This is a very important consideration as it permits the artillery to be used effectually up to the last possible moment without danger of its loss.

Another advantage of our invention is that, in its preferred construction, the cars carrying the guns include complete instrumentalities for aiming the guns, both as to elevation and direction. No part of the gun-training mechanism is separately carried by the foundation, but the entire structure is self-contained on the car. In this way it is possible to determine accurately the relation of the guns to the car, and no adjustments have to be made between the gun and the base after bringing the car to position on the latter, in order to permit the gun to be trained.

Another advantage of this arrangement is that it is possible to so mount the gun on the car that it may be fired in any direction and at any desired elevation, its adjustments being in no way limited by the structural restrictions of parts located on the bases.

Our invention also contemplates the provision of means for accurately determining the location of the gun with relation to the base, or foundation, or to a particular and known point on the track, or gun location, as it may be called. This feature, taken in connection with the provision of aiming mechanism on the car, makes possible the firing of the guns with the same degree of rapidity and accuracy, and in accordance with the systems of fire control employed in connection with the guns of permanent fortifications. That is to say, a system of ranges and salvo points may be previously established with relation to each base or gun location, and the gun angles and elevations charted, and this data may be utilized for controlling the fire from our mobile guns just as accurately as such data may be utilized with the fixed armament of fortifications. This is accomplished by bringing the cars carrying the guns to the pre-determined positions for which the salvo points have been established, when the known angles and elevations become immediately available for use in controlling the guns. This is a matter of the greatest importance, particularly in connection with artillery of long range, as it is not possible to fire such artillery with any degree of accuracy by direct sighting. Moreover, it is possible to use the guns as accurately at night as in the day-time, as the proper aiming of the guns becomes merely a matter of mathematics.

While we have illustrated, and described, one preferable embodiment of our invention, the same is to be considered illustrative rather than definitive, as changes may be resorted to without departing from the spirit and scope of the invention, as for instance, we have in explaining one phase of the invention described the mobile gun support or carriage as being transportable on the tracks of a railroad to facilitate placing the gun in action upon a stationary or fixed support, it is manifest that, in some instances, it may be found desirable to employ a road vehicle as means of transporting the gun to the stationary supporting foundation, and this comes well within the broad aspect of our invention.

Having thus described our invention, which we claim as new herein and desire to secure by Letters Patent, is:—

1. In a system of mobile armament, the combination of a railroad track comprising a pair of parallel rails and a supporting bed, said supporting bed being reinforced at intervals to provide zones of greater strength than the remainder of said bed, and cars adapted to run over said track and having guns mounted thereon adapted to be fired from said cars when located over said reinforced zones without removing the guns or running gear from the car, each of said reinforced zones being long enough to receive at least one gun carrying car and being of sufficient strength to take up the shock of recoil incident to the firing of the gun.

2. In a system of mobile armament, the combination of a railroad, a fixed support, a mobile gun support provided with suitable trucks for traveling on said railroad and having a gun mounted thereon and adjustable as to angularity and inclination with relation thereto, and means for bringing said mobile support into fixed supporting relation on said fixed support without removing said trucks or displacing said mobile support therefrom, so as to support the gun in position for firing from the trucks while relieving them from the greater shocks incident to firing.

3. In a system of mobile armament, a roadway, a supporting foundation associated therewith, a car adapted to travel over said roadway into a position to coöperate with said foundation, means for bringing said car into fixed supported relation to said foundation without removing the running gear therefrom, and a gun adjustably mounted as to angularity and inclination on said car and adapted to be fired therefrom in adjusted position.

4. In a system of mobile armament, the combination of a roadway, a foundation, a car including a body and carrying wheels adapted to be moved along said roadway to a position upon said foundation, means for bringing said car body into fixed supported relation on said foundation without displacing said body from said wheels, and a gun adjustably mounted as to angularity and inclination on said car body, and adapted to be fired from said car body in adjusted position when said car body is supported upon said foundation.

5. In a system of mobile armament, the combination of a roadway, a foundation, a car including a body and carrying wheels adapted to be moved along said roadway to a position on said foundation, means for locking said car body in predetermined fixed position on said foundation without removing the carrying wheels and a gun adjustably mounted as to angularity and inclination on said car body, and adapted to be fired therefrom in adjusted position when said car body is locked to said foundation.

6. In a system of mobile armament, the combination of a railroad track having a reinforced zone, a car including a body and wheeled trucks movable along said railroad track to a position over said reinforced zone, means for locking said car in predetermined fixed position with relation to said reinforced zone, and a gun adjustably mounted as to angularity and inclination on said car body and capable of being fired therefrom in adjusted position when said car is supported by said reinforced zone without removing the wheeled trucks from the car.

7. In a system of mobile armament, the combination of a railroad track, a foundation associated therewith, a car including a body and wheeled trucks adapted to be moved along said railroad track to a position in which said car body is supported by said foundation, means for locking said car body in predetermined fixed supported position on said foundation, and a gun mounted on said car body and adjustable thereon as to angularity and inclination, said gun being capable of being fired in adjusted position from said car body when said car body is locked to said foundation without removing the wheeled trucks from the car.

8. In a system of mobile armament, the combination of a roadway, fixed supporting bases associated with said roadway, a car adapted to travel along said roadway into a position over any one of said fixed supporting bases, quick detachable means for rigidly fastening the car body to any one of said bases without displacing said body from the roadway or removing the running gear from the car, and a gun adjustably mounted as to angularity and inclination on said car body and capable of being fired therefrom in adjusted position when said car body is fastened to one of said supporting bases.

9. A system of mobile armament, comprising a railroad having reinforced concrete gun supporting bases therebeneath at points therealong, a mobile gun carrying support provided with suitable running gear adapted to travel over said railroad and means for lowering the mobile gun carrying support upon any one of the reinforced fixed gun supports without removing the running gear.

10. In a system of mobile armament, the combination of a railroad, fixed foundations beneath said railroad at separated points therealong, a gun support provided with suitable running gear capable of travel along said railroad, means for lowering said gun support with relation to said running gear without removing the running gear therefrom, whereby said gun support may be lowered into supported position upon any one of said fixed foundations, and a gun permanently mounted on said gun support and capable of being fired therefrom.

11. A system of mobile armament, comprising a main line of railroad provided with military spurs located at strategic points, each of said spurs having the road bed of the tracks reinforced at one or more points to provide zones of greater strength than the remaining transporting portions of said road bed, which latter are normally incapable of resisting the firing strain of guns of large caliber, cars adapted to run over said road bed, and large caliber guns adapted to be fired at different lateral angles from said cars when located over said reinforced zones, each of said reinforced zones being long enough to receive at least one gun carrying car and being of sufficient strength to take up the shock of recoil incident to the firing of the gun and thereby relieve the running gear from such shocks.

12. A system of mobile armament comprising an ordinary railroad incapable of resisting the firing strains of large caliber guns provided with a plurality of military spurs or branches grouped so as to provide predetermined locations for and formed to support under firing conditions a plurality of large caliber guns grouped in battery arrangement in combination with a plurality of cars adapted to be transported over said railroad to said military spurs or branches, said cars carrying large caliber guns permanently mounted thereon for firing at different lateral angles, and means for fixedly supporting a gun carrying car part to receive the shocks while relieving the running gear therefrom.

13. A system of mobile armament, comprising a railroad, provided with a plurality of military spurs or branches grouped so as to provide predetermined locations for a plurality of guns grouped in battery arrangement, the road bed of said spurs or branches being reinforced to provide zones of greater strength than the remaining transporting portions of said bed, which latter are normally incapable of resisting the firing strains of guns of large caliber, each of said reinforced zones being at least long enough to receive one gun carrying car and to take up the shock of recoil incident to the firing of a gun in all directions, in combination with a plurality of cars adapted to be transported over said railroad and on to the gun locations on said spurs or branches to relieve the running gear of firing recoil, said cars having large caliber guns permanently mounted thereon.

14. The combination with a fixed supporting base, of a car including wheels and a body movable on said wheels to a position over said supporting base, and means for bringing integral portions of said car body into supporting relation with said base outside of said wheels without displacing said car body from said wheels or removing said wheels.

15. The combination of a railroad track, a fixed supporting base over which said track passes, a car including a body of normal width and wheel supporting trucks therefor, said car body being movable on said trucks to a position over said supporting base, means for bringing integral portions of said car body into supported relation with said base at each side of said track without removing the trucks from said car body or displacing the car body therefrom, or extending any portion of said car body beyond its normal width when traveling on the track, and a gun adjustably mounted as to angularity and inclination on said car body and capable of being fired in adjusted position on said car body when the latter is supported on said fixed supporting base.

16. In a system of mobile armament, the combination with a fixed supporting base capable of resisting firing strains of large caliber guns of a car including a body and running gear, a turn table mounted on said body and wholly contained within the normal width thereof, whereby said structure can be transported over ordinary railway lines, a large caliber gun mounted on said turntable, and means for bringing said car body into load supporting relation with said base, whereby the energy of recoil when the gun is fired incapable of being resisted by the ordinary railroad will be transmitted from the car body to said base to relieve the running gear from such recoil.

17. The combination of a railroad track, a foundation over which said track passes, a car including a body and running gear, a turn table mounted on said body and wholly contained within the normal width thereof, whereby said structure can be transported over railway lines, a gun mounted on said turntable, means for bringing integral portions of said car body into supported relation with said foundation at each side of said track without removing the trucks from said car or displacing the car body therefrom.

18. The combination of a railroad track, a foundation over which said track passes, a car including a body of normal width and wheeled trucks therefor, a turn table on said car body, a gun mounted on said turn table and means for lowering the car body and turn table with relation to said trucks to bring said car body and turn table into load supporting position on said foundation without removing said trucks.

19. The combination of a railroad track and foundation over which said track passes, a car including a body of normal width and wheeled trucks therefor, a turn table on said car, a gun mounted on said turn table, means for bringing the side portions of said car body into supported position on said foundation without removing said trucks and means for locking the side portions of the car body to said foundation.

20. In combination, with a railroad, a railroad car mounting heavy ordnance, a fixed installed supporting element associated with the railroad adapted to coöperate with the car while the car is in transportable position upon the railroad, said fixed supporting element being capable of withstanding the shock incident to firing the ordnance.

21. In combination with a railroad, a railroad car mounting heavy ordnance, a fixed installed support associated with the railroad with means for securely fastening the ordnance supporting part of the car to the fixed support with the car remaining in transportable position upon the railroad, said fixed support being capable of withstanding shock incident to firing the ordnance.

22. In a system of mobile armament, the combination of a railroad track, a fixed supporting element built into the road bed, a railroad gun carrying car adapted to coöperate with the supporting element to permit the firing of the gun without removing it or the running gear of the car.

23. In combination with a railroad, a railroad car mounting heavy ordnance, a fixed supporting element installed on the road bed associated with the railroad and located beneath the car when the same is in position for ordnance firing, said supporting element coöperating with the lower portion of the car while the same remains in transportable position on the railroad, and capable of withstanding the shock incident to firing the ordnance.

24. In a system of mobile armament, the combination with a railroad and a concrete base therebeneath, of a railroad car adapted to travel over said railroad, a gun carriage permanently mounted thereon, a heavy piece of ordnance mounted on the carriage, a turntable adapted to turn the gun carriage so the ordnance may be fired in any direction from the concrete base, and means for bringing the ordnance into supporting relation with the base to resist the shock incident to firing the ordnance while retaining the car in position for immediate transportation.

25. In a system of mobile armament, the combination of a railroad track, of a fixed installed support, a railroad gun-carrying car having a gun carriage permanently mounted in the car, and a turn-table adapted to coöperate with the gun and support to permit the firing of the gun in any direction from the support so that the support will withstand the shock incident to firing while retaining the car in position for immediate use.

26. The combination with an ordinary railroad incapable of resisting the firing strains of heavy ordnance adapted to be transported by a car thereover, of separate recoil-absorbing means built at intervals in the zone to be protected and adapted to receive the car in transportable position and support the ordnance under firing conditions.

27. The combination with an ordinary railroad incapable of resisting the firing strains of heavy ordnance adapted to be transported by a car thereover, of separate fixed recoil-absorbing emplacements built at intervals in the zone to be protected and adapted to receive and support the ordnance and receive and retain the car in transportable position and to resist recoil under firing conditions.

28. The combination with an ordinary railroad incapable of resisting the firing strains of heavy ordnance adapted to be transported thereover, of recoil-absorbing means operatively associated with said railroad to be disposed in the line of said railroad to receive and support the ordnance and to receive and retain the ordnance carrying car in transportable position and to resist recoil under firing conditions.

29. The combination with an ordinary railroad incapable of resisting the firing strains of heavy ordnance adapted to be transported thereover, of separate means operatively associated with the railroad to be disposed at various points along the line of said railroad adapted to receive and support the ordnance and to receive and retain the ordnance carrying car in transportable position and to resist recoil under firing conditions.

30. The combination with an ordinary railroad incapable of resisting the firing strains of heavy ordnance adapted to be transported thereover, of an ordnance transporting and supporting car, the heavy ordnance on said car, and separate recoil-absorbing emplacements built at intervals in the zone to be protected and adapted to receive and support the ordnance and to receive and retain the ordnance carrying car in transportable position and to resist recoil under firing conditions.

31. The combination with an ordinary railroad incapable of resisting the firing strains of heavy ordnance adapted to be transported thereover, of an ordnance transporting and supporting car, the heavy ordnance on said car, and separate recoil-absorbing emplacements built at intervals adjacent to said railroad in the zone to be protected and adapted to receive and support the ordnance under firing conditions in the position of travel over the railroad.

32. The combination with an ordinary railroad incapable of resisting the firing strains of heavy ordnance adapted to be transported thereover, of an ordnance transporting and supporting car, the heavy ordnance on said car, and means operatively associated with the railroad and the car disposed at a suitable point along the railroad to support the ordnance under firing conditions and relieve the railroad and the running gear of the recoil shock.

33. The combination with an ordinary railroad incapable of resisting the firing strains of heavy ordnance adapted to be transported thereover, of an ordnance transporting and supporting car, the heavy ordnance on said car, and means operatively associated with the railroad and the car to be disposed at a suitable point along the railroad to support the ordnance under firing conditions and relieve the railroad of the recoil shock, said means including means movable with the car and ordnance carried thereby, and complemental parts disposed at intervals along the railroad to coöperate in traveling position to the car and enable the firing of the ordnance at predetermined fixed positions.

34. The combination with an ordinary railroad incapable of resisting the firing strains of heavy ordnance to be transported thereover, of recoil-absorbing means operatively associated with the railroad, disposed in the railroad, and anchoring portions for the ordnance constituting part of said means, said anchoring portions serving to retain the ordnance in operative position against recoil.

35. The combination with an ordinary railroad incapable of resisting the firing strains of heavy ordnance adapted to be transported thereover, of an ordnance transporting and supporting car, the heavy ordnance on said car, and a recoil-absorbing emplacement disposed in the railroad, and anchoring means for the car and ordnance intact constituting a part of the emplacement, and serving to retain the car and ordnance in operative position against recoil.

36. The combination with an ordinary railroad incapable of resisting the firing strains of heavy ordnance adapted to be transported thereover, of an ordnance transporting and supporting car, the heavy ordnance on said car, and means independent of the ordinary railroad construction for anchoring and securing the ordnance while in traveling position on the railroad to relieve said railroad of strains under firing conditions and car running gear of the ordnance.

37. The combination with an ordinary railroad incapable of resisting the firing strains of heavy ordnance adapted to be transported thereover, of an ordnance transporting and supporting car, the heavy ordnance on said car, and means for anchoring the transporting car with its ordnance in firing position on the car, said means comprising a fixed emplacement operating to relieve said car of strains under firing conditions of the ordnance.

38. In a mobile armament system, the combination of a net-work of ordinary railroads covering a territory, of heavy guns with sufficient range to cover the intervening territory, transporting cars for the guns, and means for supporting the guns under firing strains at various points on the railroads whereby the shells may be projected from the railroad to any point in the intervening territory while retaining the cars in transportable position.

39. A system of mobile armament, comprising a railway including rails and bed, a gun, a car for transporting the gun on the railway, and an installed base adjacent the rails for supporting the gun in recoil independent of the car wheels while the car is positioned with relation to the railway for permitting transportation of the gun over the railway.

40. A system of mobile armament, comprising a railway including bed and rails, of a plurality of installed recoil resistance emplacements at different points communicating with the railway, a car, a gun on the car, and means for transferring the weight of the gun to the emplacement while retaining the car in transporting position with relation to the gun and railway.

41. A system of mobile armament, comprising a railway, a railway car thereon and an installed support adjacent the railway adapted to receive independent of the car wheels the shocks incident to firing the ordnance while the car is in traveling position on the railway.

42. A system of mobile armament, comprising a railway, a railway car, heavy ordnance mounted on the car, and an installed emplacement at the sides of the rail to support the gun during firing while the car is maintained in traveling position on the railway.

43. In a system of mobile armament, a railroad, a railroad car for traveling thereon, a gun mounted on the car, and an installed base at opposite sides of the railroad for supporting the gun during firing while the car is maintained in traveling position on the railroad.

CECIL F. DAWSON.
LAWRENCE W. LUELLEN.